June 12, 1951  J. P. BUNCE  2,556,520
SHELF ATTACHMENT FOR TOASTERS
Filed Feb. 6, 1948  2 Sheets-Sheet 1

INVENTOR.
John P. Bunce
BY

June 12, 1951    J. P. BUNCE    2,556,520
SHELF ATTACHMENT FOR TOASTERS
Filed Feb. 6, 1948    2 Sheets-Sheet 2
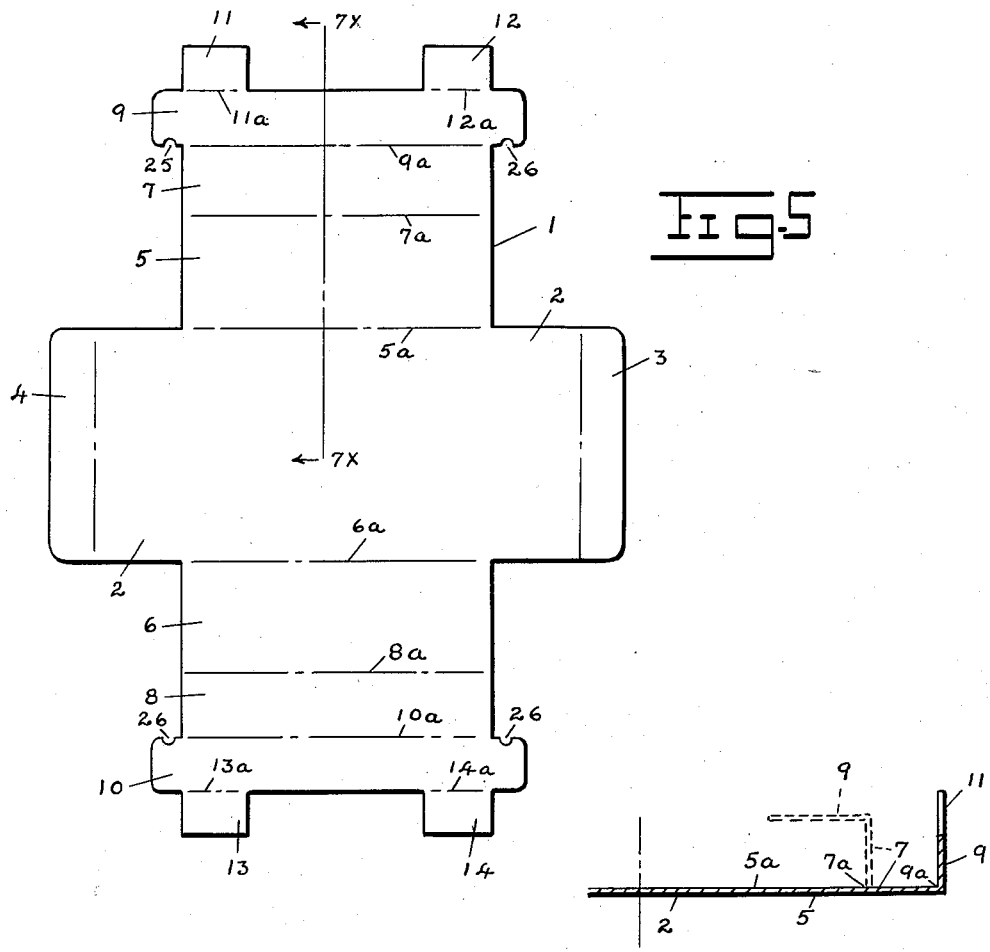
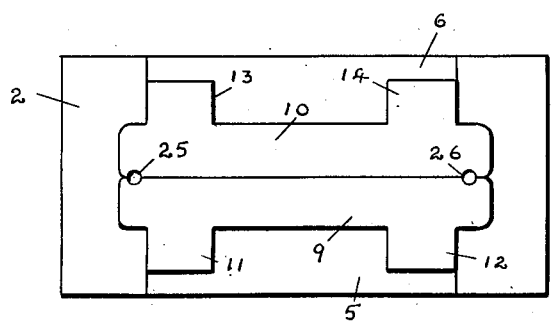
INVENTOR.
John P. Bunce
BY Frank Keifer
atty Patented June 12, 1951

2,556,520

UNITED STATES PATENT OFFICE 2,556,520

SHELF ATTACHMENT FOR TOASTERS

John P. Bunce, Rochester, N. Y.

Application February 6, 1948, Serial No. 6,672

2 Claims. (Cl. 248—205)

Toasters for toasting bread by the heat generated by an electric current are in common use, and many of such toasters have a central heating unit with a skeleton wire frame on each side, each of which frames is adapted to hold a slice of bread near the heating unit and in position to receive heat therefrom so that both of said slices will be toasted simultaneously from the one heating unit between them, without being burnt by contact.

On each side of the toaster is usually provided a door carried on a horizontal pivot that can swing up into an upright position for the purpose of holding the slice of bread against the wire frame. Such toasters have a narrow top that is not suitable for holding the bread before and after toasting.

The object of my invention is to provide an attachment with a broad top plate that can be easily and cheaply made that can be fastened to the narrow top of such toasters on which broad top plate the toast can be kept warm.

Another object of the invention is to make this attachment folded from a blank made in one sheet of metal.

Another object of the invention is to provide the blank with certain extensions or lugs that can be bent or folded so as to engage with the structure of the toaster.

Another object of the invention is to elevate the shelf above the toaster so that the swinging doors of the toaster can be moved without interference from this attachment.

These and other objects of the invention will be illustrated in the drawings, described in the specification and pointed out in the claims at the end thereof.

In the drawings:

Figure 5 is a top plan view of the one-piece blank from which the attachment is folded.

Figure 6 is a bottom plan view of the attachment shown in Figure 1.

Figure 1:
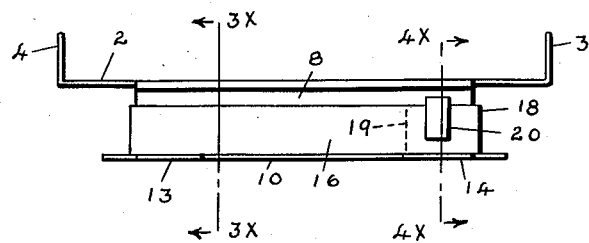
Figure 1 is a side elevation of the finished attachment already to be mounted on the toaster.

Figure 7 is a section on the line 7x, 7x of Figure 5 showing the plates 9 and 7 in the two stages of their formation.

In the drawings, like reference numerals indicate like parts.

In the drawings, reference numeral 1 indicates the blank from which the attachment is folded. In this blank there is a central rectangular plate 2 on the ends of which are the flanges 3 and 4, which flanges are bent to an upright position as shown in Figure 1.

To the sides of the central plate are connected the connecting or reinforcing plates 5 and 6, which plates are connected to the plate 2 on the bending lines 5a and 6a.

Outside of the plates 5 and 6 are formed the plaes 7 and 8, which are connected to the plates 5 and 6 respectively on the bending lines 7a and 8a.

Outside of the plates 7 and 8 are the base plates 9 and 10, which are connected to the upright plates 7 and 8 on the bending lines 9a and 10a.

Extending outwardly from the base plate 9 are the two lugs 11 and 12, which are connected thereto on the bending lines 11a and 12a.

Extending outwardly from the base plate 10 are the lugs 13 and 14, which are connected thereto on the bending lines 13a and 14a.

In forming the attachment shown in Figures 1, 2, 3, 4 and 6 from the blank shown in Figure 5 I proceed as follows:

The plates 9 and 10 are bent up 90° on the bending lines 9a and 10a so that they stand at right angles to the plates 7 and 8. This is shown in Figure 7. Thereafter the plates 7 and 8 are bent 90° on the bending lines 7a and 8a so that they stand at right angles to the plates 5 and 6. This is shown in dotted lines in Figure 7.

Figure 2:
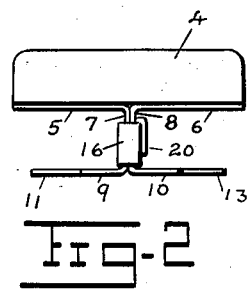
Figure 2 is an end elevation of the attachment shown in Figure 1.
Figure 4:
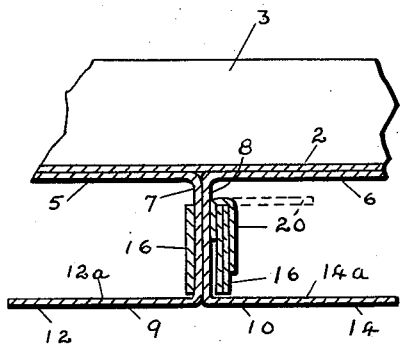
Figure 4 shows an enlarged section of the attachment for a toaster, the section being taken on the line 4x, 4x of Figure 1 showing the band and the locking device therefor. Part of the attachment is broken away.

Thereafter the plates 5 and 6 are bent around 180° under the plate 2 so that the plates 5 and 6 extend inwardly under and parallel to the plate 2. With the plates 5 and 6 in this position, the plates 7 and 8 will stand back to back to each other in an upright or downright position and the plates 9 and 10 will stand in line with each other extending outwardly from the plates 7 and 8 as is shown in Figure 2.

Figure 3:
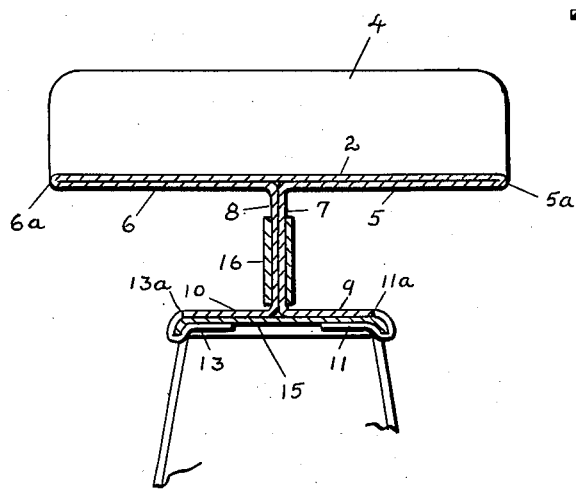
Figure 3 shows an enlarged section of the attachment for a toaster, the section being taken on the line 3x, 3x of Figure 1. It also shows the upper portion of the toaster and the devices by which the attachment is fastened to the frame of the toaster.

Thereafter the attachment can be applied to the top of the frame of the toaster so that the plates 9 and 10 rest on the top plate 15 of the toaster and thereafter the lugs, 11, 12, 13 and 14 can be bent around substantially 180° under the top plate of the toaster conforming to the shape of the plate 15 of the toaster as shown in Figure 3.

Before the attachment is applied to the top plate of the toaster a separate binding strip 16 is wrapped around the plates 7 and 8. The ends of this strip overlap each other by about an inch. One end of the strip terminates at 18 in Figure 1 and the other end of the strip is indicated by the dotted line at 19. A locking strip 20 bent at right angles has one end of it placed back of the binding strip 16 at its overlapping point as shown in Figure 1, the free end being shown in the dotted line position shown in Figure 4. Thereafter this free end is bent down to the full line position shown in Figure 4, thus firmly holding the binding strip in position around the plates 7 and 8.

It will be understood that a sample of this attachment has been made of sheet aluminum having a thickness of about .021, and that the thickness as shown in the drawing has been made more than this in the interest of clearness.

It will also be understood that in Figure 6, I have shown two bolt holes 25 and 26 by which the attachment may be bolted to the top of a standard toaster and these bolt holes are provided for in plates 9 and 10 in Figure 5 where they are shown as the half rounds 25, 25 and 26, 26. If the bolt holes are used, the lugs 11, 12, 13 and 14 can be omitted and the plates 9 and 10 can be bolted on top of the top plate of the toaster or can be substituted for the top plate of the toaster.

I claim:

1. In an attachment for a toaster, the combination of a top plate formed of one thickness of metal and partly reinforced by other sheets of metal, a web attached to the reinforcing sheets and supporting the top plate on the middle line thereof, said web being formed of two thicknesses of metal, flanges at the bottom of said web attached to and extending laterally from the web, said flanges being parallel to the top plate, all the parts of the support being bent from a single sheet of metal and being connected together on bending lines with each other in the finished support.

2. In an attachment for a toaster, the combination of a rectangular top plate, a short plate extending from each side thereof, said short plates being bent under the top plate and forming a reinforcement for the top plate, a web bent down from the edge of each of said short plates, said webs standing side by side in close contact with each other, flanges on the bottom of said web bent outwardly therefrom and forming a base for said support, a lug extending sideways from each end of the flanges, a half round hole in each meeting edge of each lug, two of said half round holes coming together to form a round hole when the meeting edges of the flanges and lugs are brought together in the finished support.

JOHN P. BUNCE.

REFERENCES CITED

The following references are of record in the file of this patent:

UNITED STATES PATENTS

| Number | Name | Date |
|---|---|---|
| 431,603 | MacKenzie-Hughes | July 8, 1890 |
| 718,545 | Streeter | Jan. 13, 1903 |
| 1,415,782 | Brace | May 9, 1922 |
| 1,747,628 | Hagel | Feb. 18, 1930 |
| 1,866,117 | Logan | July 5, 1932 |
| 2,201,826 | Ditchfield | May 21, 1940 |
| 2,235,685 | Klein | Mar. 18, 1941 |
| 2,240,024 | Stone et al. | Aug. 29, 1941 |
| 2,274,253 | Howell | Feb. 24, 1942 |
| 2,449,530 | Lambert | Sept. 14, 1948 |

FOREIGN PATENTS

| Number | Country | Date |
|---|---|---|
| 371,078 | Italy | May 11, 1939 |